US011665656B2

(12) United States Patent
Tang

(10) Patent No.: US 11,665,656 B2
(45) Date of Patent: *May 30, 2023

(54) INFORMATION TRANSMISSION METHOD AND INFORMATION TRANSMISSION APPARATUS

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 73 days.

This patent is subject to a terminal disclaimer.

(21) Appl. No.: 17/214,733

(22) Filed: Mar. 26, 2021

(65) Prior Publication Data

US 2021/0219250 A1 Jul. 15, 2021

Related U.S. Application Data

(63) Continuation of application No. 16/314,831, filed as application No. PCT/CN2016/091721 on Jul. 26, 2016, now Pat. No. 11,032,784.

(51) Int. Cl.
*H04W 4/00* (2018.01)
*H04W 56/00* (2009.01)
*H04L 27/26* (2006.01)
*H04L 5/00* (2006.01)
*H04L 1/00* (2006.01)
(Continued)

(52) U.S. Cl.
CPC ......... *H04W 56/001* (2013.01); *H04L 1/0038* (2013.01); *H04L 5/0048* (2013.01); *H04L 5/0082* (2013.01); *H04L 5/0094* (2013.01); *H04L 27/261* (2013.01); *H04W 56/0015* (2013.01); *H04W 72/0453* (2013.01); *H04J 11/0073* (2013.01); *H04J 11/0076* (2013.01); *H04L 5/0007* (2013.01)

(58) Field of Classification Search
None
See application file for complete search history.

(56) References Cited

U.S. PATENT DOCUMENTS 11,032,784 B2 * 6/2021 Tang ............... H04W 56/0015
2008/0205351 A1 8/2008 Lindoff
(Continued)

FOREIGN PATENT DOCUMENTS

CN 103326977 A 9/2013
CN 103874207 A 6/2014
(Continued)

OTHER PUBLICATIONS

Office Action of the Australian application No. 2016416149, dated Apr. 12, 2021.
(Continued)

*Primary Examiner* — Clemence S Han
(74) *Attorney, Agent, or Firm* — Ladas & Parry, LLP

(57) ABSTRACT

The embodiments of the invention provide an information transmission method and apparatus. The method comprises: determining, from a plurality of numerologies, a target numerology, and transmitting or receiving, according to the target numerology, a synchronization signal.

18 Claims, 3 Drawing Sheets

(51) Int. Cl.
H04W 72/0453 (2023.01)
H04J 11/00 (2006.01)

(56) References Cited

U.S. PATENT DOCUMENTS

| | | | |
|---|---|---|---|
| 2009/0185632 A1* | 7/2009 | Cai | H04L 5/1469 |
| | | | 375/260 |
| 2013/0176952 A1 | 7/2013 | Shin | |
| 2014/0192820 A1 | 7/2014 | Azizi | |
| 2014/0193916 A1 | 7/2014 | Pyne | |
| 2014/0302863 A1 | 10/2014 | Chen et al. | |
| 2015/0036645 A1 | 2/2015 | Shin et al. | |
| 2015/0110051 A1 | 4/2015 | Azizi et al. | |
| 2016/0294498 A1* | 10/2016 | Ma | H04L 5/0007 |
| 2016/0352551 A1* | 12/2016 | Zhang | H04L 27/2646 |
| 2017/0156140 A1* | 6/2017 | Islam | H04L 5/0044 |
| 2017/0367046 A1* | 12/2017 | Papasakellariou | H04L 5/0053 |
| 2018/0019902 A1* | 1/2018 | Suh | H04L 27/2607 |
| 2018/0084551 A1 | 3/2018 | Shin et al. | |
| 2018/0262900 A1 | 9/2018 | Moon et al. | |
| 2019/0007175 A1* | 1/2019 | Kwak | H04L 5/00 |
| 2019/0036634 A1 | 1/2019 | Cheng et al. | |
| 2019/0098637 A1* | 3/2019 | Chapman | H04W 72/048 |
| 2019/0103931 A1* | 4/2019 | Yi | H04B 7/2656 |
| 2019/0230696 A1* | 7/2019 | Kim | H04L 5/0007 |
| 2019/0268205 A1* | 8/2019 | Shin | H04L 27/2675 |
| 2019/0306819 A1 | 10/2019 | Park et al. | |
| 2020/0112846 A1 | 4/2020 | Moon et al. | |
| 2020/0214011 A1 | 7/2020 | Shin et al. | |
| 2020/0228383 A1 | 7/2020 | Kim et al. | |

FOREIGN PATENT DOCUMENTS

| | | |
|---|---|---|
| CN | 105103592 A | 11/2015 |
| CN | 105636105 A | 6/2016 |
| CN | 106788931 A | 5/2017 |
| CN | 107371249 A | 11/2017 |
| EP | 2215756 A2 | 8/2010 |
| EP | 3324697 A1 | 5/2018 |
| EP | 3435707 A1 | 1/2019 |
| EP | 3442141 A1 | 2/2019 |
| EP | 3451571 A1 | 3/2019 |
| EP | 3462639 A1 | 4/2019 |
| EP | 3474614 A1 | 4/2019 |
| EP | 3490316 A1 | 5/2019 |
| JP | 2019511174 A | 4/2019 |
| RU | 2454837 C2 | 6/2012 |
| WO | 2015080646 A1 | 6/2015 |
| WO | 2016065838 A1 | 5/2016 |
| WO | 2017167010 A1 | 10/2017 |
| WO | 2018008459 A1 | 1/2018 |

OTHER PUBLICATIONS

Notice of Review of the Taiwanese application No. 106122647, dated Jun. 24, 2021.
NTT Docomo et al: "Study on New Radio Access Technology", 3GPP Draft; RP-160901 SR _FS _NR _Newrat, 3rd Generation Partnership Project (3GPP), Mobile Competence Centre; 650, Route Des Lucio Les; F-06921 Sophia-Antipolis Cedex; France, vol. TSG RAN, No. Busan, Korea; Jun. 13, 2016-Jun. 16, 2016; Jun. 7, 2016 (Jun. 7, 2016), XP051659471; * Section 2, Agreements referring to RAN1#85(May 2016); entire document.
Sony: "Synchronisation Signal Design Principles for NB-IoT", 3GPP Draft; R1-155879, 3rd Generation Partnership Project (3GPP), Mobile Competence Centre; 650, Route Des Lucioles; F-6921 Sophia-Antipolis Cedex; France, vol. RAN WG1, No. Malmo, Sweden; Oct. 5, 2015-20151889; Oct. 4, 2015 (Oct. 4, 2015), XP051002667; entire document.
Huawei et al: "Initial access in NR", 3GPP Draft; R2-163923 Initial Access in NR, 3rd Generation Partnership Project (3GPP), Mobile Competence Centre; 650, Route Des Lucioles; F-6921 Sophia-Antipolis Cedex; France, vol. RAN WG2, No. Nanjing, China; May 23, 2016-May 27, 2016; May 22, 2016 (May 22, 2016), XP051105295; entire document.
LG Electronics: "Support different numerology and different usage scenarios", 3GPP Draft; R1-164561 NR Vertical V3, 3rd Generation Partnership Project (3GPP), Mobile Competence Centre; 650, Route Des Lucioles; F-06921 Sophia-Antipolis Cedex; France, vol. RAN WG1, No. Nanjing, China May 23, 2016-May 27, 2016; May 14, 2016 (May 14, 2016), XP051096378; entire document.
Intel Corporation: "Overview of new radio access technology requirements and designs", 3GPP Draft; R1-162379—Intel 5G NR Overview, 3rd Generation Partnership Project (3GPP ), Mobile Competence Centre; 650, Route Des Lucio Les; F-06921 Sophia-Antipolis Ced Ex; France, vol. RAN WG1, No. Busan, Korea; Apr. 11, 2016-Apr. 15, 2016; Apr. 2, 2016 (Apr. 2, 2016), XP051080158; entire document.
CATT: "Discussion of NR Numerology", 3GPP Draft; R1-164249 NR Numerology, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016; May 14, 2016 (May 4, 2016), XP051090037; entire document.
Written Opinion of the International Search Authority in the international application No. PCT/CN2016/091721, dated Feb. 28, 2017.
Supplementary European Search Report in the European application No. 16909998.3, dated May 29, 2019.
International Search Report in international application No. PCT/CN2016/091721, dated Feb. 28, 2017.
First Office Action of the Chilean application No. 201900193, dated Aug. 23, 2019.
First Office Action of the Russian application No. 2019104981, dated Dec. 23, 2019.
First Written Opinion of the Singaporean application No. 11201900714V, dated Mar. 18, 2020.
Second Written Opinion of the Singaporean application No. 11201900714V, dated Mar. 5, 2021.
First Office Action of the Chinese application No. 201680088043.7, dated May 8, 2020.
MCC Support, Draft Report of 3GPP TSG RAN WG1 #85 v0.1.0, 3GPP TSG RAN WG1 Meeting #86 R1-16xxxx Göteborg, Sweden, Aug. 22-26, 2016, entire document.
First Office Action of the Brazilian application No. 1120190014748, dated Aug. 4, 2020.
First Office Action of the Israeli application No. 264474, dated Aug. 23, 2020.
First Office Action of the Indian application No. 201917006528, dated Sep. 11, 2020.
First Office Action of the Japanese application No. 2019-504004, dated Oct. 6, 2020.
First Office Action of the European application No. 16909998.3, dated Dec. 9, 2020.
Second Office Action of the Canadian application No. 3031986, dated Nov. 23, 2020.
First Office Action of the Taiwanese application No. 106122647, dated Jan. 18, 2021.
First Office Action of the U.S. Appl. No. 16/314,831, dated Apr. 2, 2020.
Final Office Action of the U.S. Appl. No. 16/314,831, dated Oct. 6, 2020.
Notice of Allowance of the U.S. Appl. No. 16/314,831, dated Jan. 1, 2021.
First Office Action of the Mexican application No. MX/a/2019/001120, dated Feb. 4, 2022.
Office Action of the Indian application No. 202018057385, dated Apr. 13, 2022.
First Office Action of the Indonesian application No. P00201901664, dated Jul. 9, 2021.
Third Office Action of the Canadian application No. 3031986, dated Aug. 27, 2021.
Second Office Action of the Israeli application No. 264474, dated Aug. 31, 2021.
Second Office Action of the Indonesian application No. P00201901664, dated Oct. 18, 2021.

(56) References Cited

OTHER PUBLICATIONS

3GPP TSG RAN WG1 Meeting #82bis R1-155960, Malmo, Sweden, Oct. 5-9, 2015; Agenda Item: 7.2.6.2.1; Source: Huawei, HiSilicon; Title: Synchronization Signal Design; all pages.
European Search Report in the European application No. 22185490.4, dated Oct. 10, 2022.
Fourth Office Action of the Indonesian application No. P00201901664, dated Nov. 9, 2022.
First Office Action of the Malaysian application No. PI2019000446, dated Sep. 27, 2022.
Third Office Action of the Indonesian application No. P00201901664, dated Jun. 21, 2022.
Hearing Notice issued in the corresponding Indian application No. 201917006528, issued on Jan. 23, 2023.

\* cited by examiner

INFORMATION TRANSMISSION METHOD AND INFORMATION TRANSMISSION APPARATUS

CROSS-REFERENCE TO RELATED APPLICATIONS

This a continuation of U.S. application Ser. No. 16/314,831, filed on Jan. 2, 2019, which is a national stage application of International Application No. PCT/CN2016/091721, filed on Jul. 26, 2016 and entitled "INFORMATION TRANSMISSION METHOD AND INFORMATION TRANSMISSION APPARATUS". The disclosures of the above applications are hereby incorporated by reference in their entireties.

TECHNICAL FIELD

The disclosure relate to the field of communications, and more particularly to an information transmission method and an information transmission device.

BACKGROUND

Along with development of networks, service requirements keep increasing and service requirement types also keep increasing. In existing network standard communication protocols, a network device and a terminal device transmit data by use of a unified numerology set. For example, the communication protocol specifies a numerology set (numerology) in a Long Term Evolution (LTE) system as follows: a radio frame is 10 ms, a radio frame includes 10 subframes, a subframe includes two time slots, a time slot includes 7 symbols, 12 continuous subcarriers in frequency and a time slot in time domain form a Resource Block (RB), each subcarrier spacing is 15 k and the like. Along with service diversification, a single numerology set already may not meet signal transmission requirements.

SUMMARY

The embodiments of the disclosure provide an information transmission method and device, which may meet signal transmission requirements.

According to a first aspect, the disclosure provides an information transmission method, which may include the following operations.

A target numerology set is determined from multiple numerology sets.

A synchronization signal is received or sent according to the target numerology set.

In combination with the first aspect, in a first possible implementation mode of the first aspect, the operation that the target numerology set is determined from the multiple target numerology sets may include the following action.

The target numerology set is determined from the multiple numerology sets according to at least one of the following information: a carrier frequency for sending the synchronization signal; a transmission environment of the synchronization signal; coverage of a carrier, a cell or a transmission node for sending the synchronization signal; transmit power for sending the synchronization signal; or form, height, direction and a number of antenna array elements of a transmit antenna for sending the synchronization signal.

In combination with the first aspect or any abovementioned possible implementation mode thereof, in a second possible implementation mode of the first aspect, the operation that the target numerology set is determined from the multiple target numerology sets may include the following actions.

A value of at least one numerology is determined according to the information.

The target numerology set is determined according to the value of the at least one numerology.

In combination with the first aspect or any abovementioned possible implementation mode thereof, in a third possible implementation mode of the first aspect, the synchronization signal may include a Primary Synchronization Signal (PSS) and a Secondary Synchronization Signal (SSS) corresponding to the PSS.

In combination with the first aspect or any abovementioned possible implementation mode thereof, in a fourth possible implementation mode of the first aspect, the target numerology set may include a first numerology set and a second numerology set, and the first numerology set may be different from the second numerology set.

The operation that the synchronization signal is received or sent according to the target numerology set may include the following actions.

The PSS is received or sent according to the first numerology set.

The SSS corresponding to the PSS is received or sent according to the second numerology set.

In combination with the first aspect or any abovementioned possible implementation mode thereof, in a fifth possible implementation mode of the first aspect, the target numerology set may include the first numerology set and the second numerology set.

The operation that the target numerology set is determined from the multiple target numerology sets may include the following actions. The first numerology set is selected from a first subset of the multiple numerology sets, wherein the first subset includes at least one of the multiple numerology sets. The second numerology set is selected from a second subset of the multiple numerology sets. The second subset includes at least one of the multiple numerology sets, and the first subset and the second subset include at least one different numerology set.

The operation that the synchronization signal is received or sent according to the target numerology set may include the following actions. The PSS is received or sent according to the first numerology set. The SSS is received or sent according to the second numerology set.

In combination with the first aspect or any abovementioned possible implementation mode thereof, in a sixth possible implementation mode of the first aspect, the method may further include one of the following operations.

Master system information is received or sent according to the first numerology set.

The master system information is received or sent according to the second numerology set.

Alternatively, the master system information is received or sent according to a third numerology set.

The third numerology set may be different from the first numerology set and the second numerology set.

In combination with the first aspect or any abovementioned possible implementation mode thereof, in a seventh possible implementation mode of the first aspect, a time-domain difference of time-domain starting locations of the PSS and the SSS corresponding to the PSS may belong to a time-domain difference set and the time-domain difference set may be a finite set; and/or, a difference of frequency-domain starting locations of the PSS and the SSS corresponding to the PSS may belong to a frequency-domain difference set and the frequency-domain difference set may be a finite set.

In combination with the first aspect or any abovementioned possible implementation mode thereof, in an eighth possible implementation mode of the first aspect, at least one of the time-domain difference of the time-domain starting locations of the PSS and the SSS corresponding to the PSS and the difference of the frequency-domain starting locations of the PSS and the SSS corresponding to the PSS may not be zero.

In combination with the first aspect or any abovementioned possible implementation mode thereof, in a ninth possible implementation mode of the first aspect, a time-frequency location occupied by the PSS and a time-frequency location occupied by the SSS corresponding to the PSS may not be overlapped.

In combination with the first aspect or any abovementioned possible implementation mode thereof, in a tenth possible implementation mode of the first aspect, the method may further include the following operation.

The master system information is received or sent.

In combination with the first aspect or any abovementioned possible implementation mode thereof, in an eleventh possible implementation mode of the first aspect, the operation that the master system information is received or sent may include the following action.

The master system information is received or sent according to a numerology set corresponding to the master system information. The numerology set corresponding to the master system information may be the same as or different from the target numerology set.

In combination with the first aspect or any abovementioned possible implementation mode thereof, in a twelfth possible implementation mode of the first aspect, the method may further include the following operation.

A time-frequency location of the master system information is determined according to a time-frequency location of the synchronization signal.

The operation that the master system information is received or sent may include the following action.

The master system information is received or sent according to the time-frequency location of the master system information.

In combination with the first aspect or any abovementioned possible implementation mode thereof, in a thirteenth possible implementation mode of the first aspect, the synchronization signal may include the PSS and the SSS corresponding to the PSS.

The operation that the time-frequency location of the master system information is determined according to the time-frequency location of the synchronization signal may include the following actions.

A time-domain starting location of the master system information is determined according to at least one of a time-frequency starting location of the PSS, a time-domain starting location of the SSS or a time-domain difference of the time-domain starting locations of the PSS and the SSS corresponding to the PSS.

A frequency-domain starting location of the master system information is determined according to at least one of a frequency-domain starting location of the PSS, a frequency-domain starting location of the SSS or a frequency-domain difference of the frequency-domain starting locations of the PSS and the SSS corresponding to the PSS.

In combination with the first aspect or any abovementioned possible implementation mode thereof, in a fourteenth possible implementation mode of the first aspect, the synchronization signal may be configured to indicate at least one of a time-frequency location, a modulation manner or a corresponding numerology set of the master system information.

In combination with the first aspect or any abovementioned possible implementation mode thereof, in a fifteenth possible implementation mode of the first aspect, all or part of a sequence corresponding to the synchronization signal or a mask of the synchronization signal may be configured to indicate at least one of the time-frequency location, the modulation manner or the corresponding numerology set of the master system information.

In combination with the first aspect or any abovementioned possible implementation mode thereof, in a sixteenth possible implementation mode of the first aspect, the numerology set may include at least one of the following parameters: a subcarrier spacing, a subcarrier number at a specific bandwidth, a number of subcarriers in a Physical Resource Block (PRB), a length of an Orthogonal Frequency Division Multiplexing (OFDM) symbol, a length of a Cyclic Prefix (CP) of the OFDM symbol, a point number of Fourier transform or inverse Fourier transform for generating an OFDM signal, a number of OFDM symbols in a Transmission Time Interval (TTI) or a number of TTIs in a specific length of time.

In combination with the first aspect or any abovementioned possible implementation mode thereof, in a seventeenth possible implementation mode of the first aspect, the multiple numerology sets or determining the target numerology set may exist in a time period from establishment to disabling of the carrier, the cell or the transmission node for sending the synchronization signal.

According to a second aspect, the disclosure provides an information transmission method, which may include the following operations.

Blind detection is performed on a target signal by use of multiple numerology sets.

The target signal is acquired according to a result of the blind detection.

In combination with the second aspect, in a first possible implementation mode of the second aspect, the target signal may be a synchronization signal and the synchronization signal may include a PSS and an SSS corresponding to the PSS.

In combination with the second aspect or any abovementioned possible implementation mode thereof, in a second possible implementation mode of the second aspect, the operation that blind detection is performed on the synchronization signal by use of the multiple numerology sets may include the following actions.

Blind detection is performed on the PSS by use of a first subset of the multiple numerology sets.

Blind detection is performed on the SSS by use of a second subset of the multiple numerology sets.

The first subset and the second subset may include different numerology sets.

In combination with the second aspect or any abovementioned possible implementation mode thereof, in a third possible implementation mode of the second aspect, the operation that blind detection is performed on the SSS by use of the second subset of the multiple numerology sets may include the following action.

Blind detection is performed on the SSS by use of the PSS, a relative location set of the PSS and the SSS corresponding to the PSS and the second subset of the multiple numerology sets, wherein the first subset and the second subset include at least one different numerology set.

In combination with the second aspect or any abovementioned possible implementation mode thereof, in a fourth possible implementation mode of the second aspect, the first subset may be a subset of the second subset.

In combination with the second aspect or any abovementioned possible implementation mode thereof, in a fifth possible implementation mode of the second aspect, the numerology set may include at least one of the following parameters: a subcarrier spacing, a subcarrier number at a specific bandwidth, a number of subcarriers in a PRB, a length of an OFDM symbol, a point number of Fourier transform or inverse Fourier transform for generating an OFDM signal, a number of OFDM symbols in a Transmission Time Interval (TTI), a number of TTIs in a specific length of time or a length of a signal prefix.

In combination with the second aspect or any abovementioned possible implementation mode thereof, in a sixth possible implementation mode of the second aspect, the multiple numerology sets for performing blind detection on the target signal may exist in a time period from establishment to disabling of a carrier, a cell or a transmission node for sending the target signal.

According to a third aspect, the disclosure provides an information transmission device, which is configured to execute the method in the first aspect or any optional implementation mode of the first aspect. Specifically, the information transmission device includes units configured to execute the method in the first aspect or any possible implementation mode of the first aspect.

According to a fourth aspect, the disclosure provides an information transmission device, which is configured to execute the method in the second aspect or any optional implementation mode of the second aspect. Specifically, the information transmission device includes units configured to execute the method in the second aspect or any possible implementation mode of the second aspect.

According to a fifth aspect, the disclosure provides an information transmission device, which includes a memory and a processor. The memory is configured to store an instruction. The processor is configured to execute the instruction stored in the memory. When the processor executes the instruction stored in the memory, such execution enables the processor to execute the method in the first aspect or any optional implementation mode of the first aspect.

According to a sixth aspect, the disclosure provides an information transmission device, which includes a memory and a processor. The memory is configured to store an instruction. The processor is configured to execute the instruction stored in the memory. When the processor executes the instruction stored in the memory, such execution enables the processor to execute the method in the second aspect or any optional implementation mode of the second aspect.

According to a seventh aspect, the disclosure provides a computer storage medium, in which a program code is stored. The program code is configured to indicate the method in the first aspect or any optional implementation mode of the first aspect to be executed.

According to an eighth aspect, the disclosure provides a computer storage medium, in which a program code is stored. The program code is configured to indicate the method in the second aspect or any optional implementation mode of the second aspect to be executed.

Therefore, in the embodiments of the disclosure, the target numerology set for transmission of the synchronization signal is selected from the multiple numerology sets, such that the condition that only an undiversified numerology set may be adopted for transmission of the synchronization signal may be avoided and the target numerology set may be selected according to the signal transmission requirement to transmit the synchronization signal.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

Figure 1:
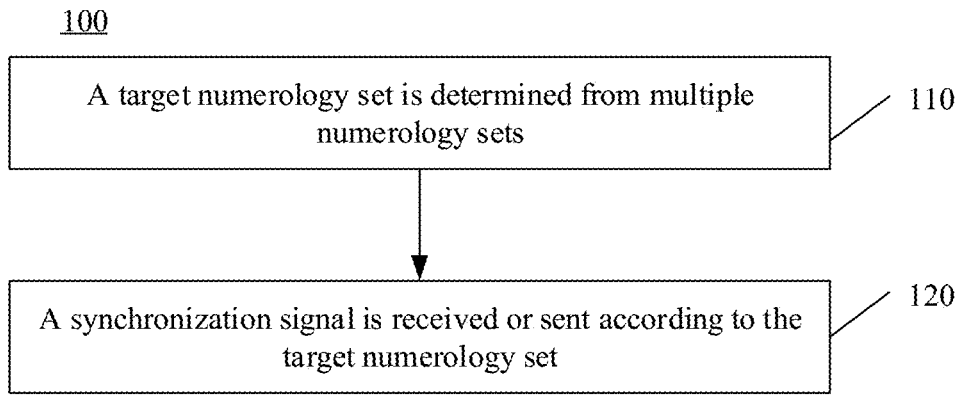
FIG. 1 is a schematic flowchart of an information transmission method according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

Each aspect or characteristic of the disclosure may be implemented into a method, a device or a product programed with a standard and/or using an engineering technology. Term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD), a Digital Versatile Disk (DVD) or the like), a smart card and a flash memory (for example, an Erasable Programmable Read-Only Memory (EPROM), a card, a stick, a key driver or the like). In addition, various storage media described in the disclosure may represent one or more devices and/or other machine-readable media configured to store information. Term "machine-readable medium" may include, but not limited to, a wireless channel and various other media capable of storing, including and/or carrying instructions and/or data.

The technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS), 5th-Generation (5G) and the like.

The technical solutions of the embodiments of the disclosure may be applied to communication of a terminal device and a network device and may also be applied to Device to Device (D2D) communication.

In the embodiments of the disclosure, a network device may be a Base Transceiver Station (BTS) in the GSM or CDMA, may also be a NodeB (NB) in WCDMA, may also be an Evolved Node B (eNB or e-NodeB) in LTE, and may further be a device configured to provide access service in 5G. There are no limits made in the embodiments of the disclosure.

Each embodiment in the disclosure is described in combination with a terminal device and the network device.

The terminal device may also be called User Equipment (UE), an access terminal, a user unit, a user station, a mobile radio station, a mobile station, a remote station, a remote terminal, a mobile device, a user terminal, a terminal, a wireless communication device, a user agent, a user device or the like. The terminal device may be a station (ST) in a Wireless Local Area Network (WLAN), and may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

The network device may be a device configured to communicate with the terminal device. The network device may be an Access Point (AP) in the WLAN, a Base Transceiver Station (BTS) in the GSM or CDMA, may also be an NB in WCDMA, and may further be an eNB or eNodeB in LTE, or a relay station or AP, or a vehicle-mounted device, a wearable device, a network device in the future 5G network, a network device in the future evolved PLMN or the like.

In embodiments of the disclosure, a numerology set may include at least one of the following parameters:

a subcarrier spacing, a subcarrier number at a specific bandwidth, a number of subcarriers in a Physical Resource Block (PRB), a length of an Orthogonal Frequency Division Multiplexing (OFDM) symbol, a point number of Fourier transform, for example, Fast Fourier Transform (FFT), or inverse Fourier transform, for example, Inverse Fast Fourier Transform (IFFT), configured to generate an OFDM signal, a number of OFDM symbols in a Transmission Time Interval (TTI), a number of TTIs in a specific length of time or a length of a signal prefix.

The subcarrier spacing refers to a frequency interval of adjacent subcarriers, for example, 15 kHz and 60 khz. The subcarrier number at the specific bandwidth is, for example, a subcarrier number corresponding to each possible system bandwidth. The number of subcarriers in the PRB may typically be, for example, an integral multiple of 12. The number of OFDM symbols in the TTI may typically be, for example, an integral multiple of 14. The number of TTIs in a certain length of time may refer to the number of TTIs in a time length of 1 ms or 10 ms. The length of a signal prefix is, for example, a time length of a CP of a signal or whether the CP adopts a normal CP or an extended CP.

In an optional embodiment, of the disclosure, multiple numerology sets exist in a time period from establishment to disabling of a carrier, cell or transmission node for sending a synchronization signal and may be configured to determine a target numerology set.

FIG. 1 is a schematic flowchart of an information transmission method 100 according to an embodiment of the disclosure. The method 100 may be applied to a sending process or receiving process of a synchronization signal. A sending party of the synchronization signal may be a network device and a receiving party may be a terminal device. In an alternative example, the sending party of the synchronization signal may be a terminal device and the receiving party may be another terminal device.

As illustrated in FIG. 1, the method includes operations in 110 and 120.

In 110, a target numerology set is determined from multiple numerology sets.

In 120, a synchronization signal is received or sent according to the target numerology set.

Therefore, in the embodiment of the disclosure, the target numerology set for transmission of the synchronization signal is selected from the multiple numerology sets, which may avoid the condition that only an undiversified numerology set may be adopted for transmission of the synchronization signal and may select the target numerology set based on the signal transmission requirement to transmit the synchronization signal.

In an optional embodiment of the disclosure, the target numerology set may be determined from the multiple numerology sets according to at least one of the following information:

a carrier frequency for sending the synchronization signal;

a transmission environment of the synchronization signal, for example, an urban environment, a highway, a high-speed railway, a mountain environment or a rural environment;

coverage of a carrier, a cell or a transmission node for sending the synchronization signal;

transmit power for sending the synchronization signal; or form, height, direction and the number of antenna array elements of a transmit antenna for sending the synchronization signal.

In an optional embodiment of the disclosure, the antenna form includes an omnidirectional antenna, a directional antenna (which may also be divided into a circular antenna array, a linear antenna array and a panel antenna array) and the like.

In an optional embodiment of the disclosure, a value of at least one numerology may be determined according to the information. The target numerology set is determined according to the value of the at least one numerology.

For example, when the carrier frequency used for transmitting the synchronization signal is below 6 GHz, it may be determined that the subcarrier spacing for transmitting the synchronization signal may be 15 KHz or 30 KHz. After the subcarrier spacing is determined, a numerology set including the subcarrier spacing of 15 KHz or 30 KHz may be determined as the target numerology set.

For example, when the carrier frequency used for transmitting the synchronization signal is 60 GHz, it may be determined that the subcarrier spacing for transmitting the synchronization signal may be 60 KHz or 120 KHz. After the subcarrier spacing is determined, a numerology set including the subcarrier spacing of 60 KHz or 120 KHz may be determined as the target numerology set.

In an optional embodiment of the disclosure, the synchronization signal mentioned may include at least one of a PSS or an SSS corresponding to the PSS.

For making the disclosure convenient to understand, the implementation of signal transmission will be described below in combination with the PSS and the SSS corresponding to the PSS in detail.

In an optional embodiment of the disclosure, the target numerology set may include a first numerology set configured to receive or send the PSS and a second numerology set configured to receive or send the SSS. The first numerology set and the second numerology set may be same or different.

That the first numerology set and the second numerology set are different may refer to that values of all parameters in the first numerology set and the second numerology set are different or values of part of parameters in the first numerology set and the second numerology set are different.

In an optional embodiment of the disclosure, the first numerology set is selected from a first subset of the multiple numerology sets, wherein the first subset includes at least one numerology set in the multiple numerology sets. The second numerology set is selected from a second subset of the multiple target numerology sets, wherein the second subset includes at least one numerology set in the multiple numerology sets. The first subset and the second subset include at least one different numerology set.

In an implementation mode, the first subset and the second subset may include completely different numerology sets.

For example, in the embodiment of the disclosure, the first numerology set is selected from part of numerology sets (which may be called the first subset) in the multiple numerology sets to receive or send the PSS. The second numerology set is selected from the other part of numerology sets (which may be called the second subset) in the multiple numerology sets to receive or send the SSS. In this case, the first numerology set may be different from the second numerology set.

In an implementation mode, the first subset may be a subset of the second subset. That is, the numerology sets in the first subset belong to the second subset.

For example, in the embodiment of the disclosure, the second numerology set is selected from the multiple numerology sets (which may be called the second subset) to receive or send the SSS. The first numerology set is selected from part of numerology sets (which may be called the first subset) in the multiple numerology sets to receive or send the PSS. In this case, the second numerology set has a greater selection range than the first numerology set, and the first numerology set and the second numerology set may be the same or different.

In an optional embodiment of the disclosure, a time-domain difference $t_{pss\text{-}sss\text{-}offset}$ of a time-domain starting location $t_{pss\text{-}start}$ of the PSS and a time-domain starting location $t_{sss\text{-}start}$ of each corresponding SSS belongs to a time-domain difference set $T_{pss\text{-}sss\text{-}offset}$. And/or, a difference $f_{pss\text{-}sss\text{-}offset}$ of a frequency-domain starting location $f_{pss\text{-}start}$ of the PSS and a frequency-domain starting location $f_{sss\text{-}start}$ of the corresponding SSS belongs to a frequency-domain difference set $F_{pss\text{-}sss\text{-}offset}$.

In an optional embodiment, the time-domain difference set $T_{pss\text{-}sss\text{-}offset}$ and $F_{pss\text{-}sss\text{-}offset}$ are finite sets.

In an optional embodiment, the time-domain difference set $T_{pss\text{-}sss\text{-}offset}$ and $F_{pss\text{-}sss\text{-}offset}$ are finite sets.

In an optional embodiment, at least one of the difference of the time-domain starting locations of the PSS and the corresponding SSS or the difference of the frequency-domain starting locations of the PSS and the corresponding SSS may be related to the used carrier frequency. Specifically, the difference of the time-domain starting locations of the PSS and the corresponding SSS and/or the difference of the frequency-domain starting locations of the PSS and the corresponding SSS may be selected according to the used carrier frequency.

In the embodiment of the disclosure, $t_{pss\text{-}sss\text{-}offset}$ may be a positive number, a negative number or 0. When $t_{pss\text{-}sss\text{-}offset}$ is a positive number, it is indicated that the time-domain starting location of the PSS is greater than the time-domain starting location of the corresponding SSS. When $t_{pss\text{-}sss\text{-}offset}$ is a positive number, it is indicated that the time-domain starting location of the PSS is less than the time-domain starting location of the corresponding SSS. When $t_{pss\text{-}sss\text{-}offset}$ is 0, it is indicated that the time-domain starting location of the PSS is equal to the time-domain starting location of the corresponding SSS.

In the embodiment of the disclosure, $f_{pss\text{-}sss\text{-}offset}$ may be a positive number, a negative number or 0. When $f_{pss\text{-}sss\text{-}offset}$ is a positive number, it is indicated that the frequency-domain starting location of the PSS is greater than the frequency-domain starting location of the corresponding SSS. When $f_{pss\text{-}sss\text{-}offset}$ is a positive number, it is indicated that the frequency-domain starting location of the PSS is less than the frequency-domain starting location of the corresponding SSS. When $f_{pss\text{-}sss\text{-}offset}$ is 0, it is indicated that the frequency-domain starting location of the PSS is equal to the frequency-domain starting location of the corresponding SSS.

In an optional embodiment of the disclosure, $f_{pss\text{-}sss\text{-}offset}$ and $t_{pss\text{-}sss\text{-}offset}$ are not both 0. This means that time-frequency starting locations of the PSS and the SSS are different at least in time domain or in frequency domain.

Figure 2:
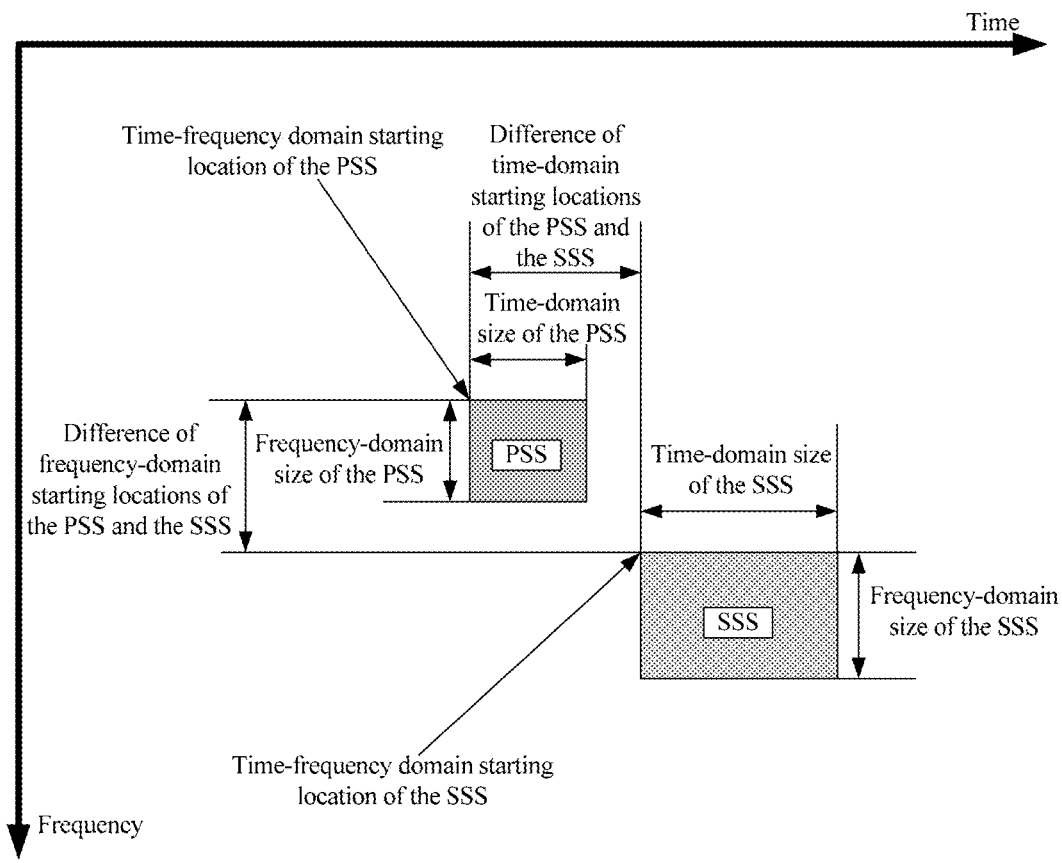
FIG. 2 is a schematic diagram of a relative location of a PSS and a corresponding SSS according to an embodiment of the disclosure.

In an optional embodiment of the disclosure, a time-frequency location occupied by the PSS and a time-frequency location occupied by the corresponding SSS are not overlapped, for example, as illustrated in FIG. 2.

In a scenario illustrated in FIG. 2 (both of the time-domain starting location and frequency-domain starting location of the PSS are ahead of (in front of) the time-domain starting location and frequency-domain starting location of the SSS), the time-domain starting location of the PSS and the time-domain starting location of the SSS may meet the following condition: $t_{sss\text{-}start}+t_{sss\text{-}size}<=t_{pss\text{-}start}$, and the frequency-domain starting location of the PSS and the frequency-domain starting location of the SSS may meet the following condition: $f_{pss\text{-}start}+f_{pss\text{-}size}<=f_{sss\text{-}start}$.

It is to be understood that FIG. 2 is only one scenario of the embodiments of the disclosure and there are other scenarios for the embodiments of the disclosure. For example, the frequency-domain starting location of the SSS is ahead of the frequency-domain location of the PSS, and then the frequency-domain starting location of the PSS and the frequency-domain starting location of the SSS may meet the following condition: $f_{sss\text{-}start}+f_{sss\text{-}size}<=f_{pss\text{-}start}$. For example, the time-domain starting location of the SSS is ahead of the time-domain starting location of the PSS, and then the frequency-domain starting location of the PSS and the frequency-domain starting location of the SSS may meet the following condition: $t_{pss\text{-}start}+t_{pss\text{-}size}<=t_{sss\text{-}start}$.

It is to be understood that a front position or rear position mentioned in the embodiment of the disclosure is only a relative concept and "front" or "rear" may be set according to a description practice of the drawing.

Reception or transmission of the synchronization signal has been described above and the following description will describe how to receive and send master system information in combination with reception or transmission of the synchronization signal. In the embodiment of the disclosure, the master system information may be called a Master Information Block (MIB).

In an optional embodiment of the disclosure, a time-frequency location of the master system information may be determined according to a time-frequency location of the synchronization signal. The master system information is received or sent according to the time-frequency location of the master system information.

In an implementation mode, a time-domain starting location of the master system information may be determined according to at least one of a time-frequency starting location of the PSS, a time-domain starting location of the SSS or a time-domain difference of the time-domain starting locations of the PSS and the corresponding SSS. A frequency-domain starting location of the master system information may be determined according to at least one of a frequency-domain starting location of the PSS, a frequency-domain starting location of the SSS or a frequency-domain difference of the frequency-domain starting locations of the PSS and the SSS.

For example, the time-frequency location of the MIB is determined by the locations of at least one of the PSS or the SSS and/or a time-frequency relative location (offset) $f_{pss-sss-offset}$ and $t_{pss-sss-offset}$ of the PSS and the SSS.

Specifically, the frequency-domain starting location of the MIB is the same as that of the PSS or the SSS or an integral multiple of $f_{pss-sss-offset}$ and the time-domain starting location is calculated from $t_{pss-sss-offset}$. For example, a relative location of the MIB and the PSS (or the SSS) is an integral multiple of $t_{pss-sss-offset}$.

In another implementation mode, the time-frequency location of the master system information may be determined according to the time-frequency starting location of the PSS or the time-frequency location of the SSS, an element in the abovementioned time-domain difference set and an element in the frequency-domain difference set. That is, after the time-frequency starting location of the PSS (or the SSS) is determined, a time-domain difference of time-domain starting locations of the master system information and the PSS (or the SSS) may be selected from the time-domain difference set and a frequency-domain difference of time-domain locations of the master system information and the PSS (or the SSS) may be selected from the frequency-domain difference set, thereby calculating the time-frequency location of the master system information.

It is to be understood that in the implementation, selection of the time-domain difference of the time-domain starting locations of the master system information and the PSS (or the SSS) from the time-domain difference set may be random selection. In such case, the selected time-domain difference may be the same as or different from the selected time-domain difference of the time-domain starting locations configured for the PSS and the corresponding SSS. Selection of the frequency-domain difference of the frequency-domain starting locations of the master system information and the PSS (or the SSS) from the frequency-domain difference set may be random selection, and in such case, the selected frequency-domain difference may be the same as or different from the selected frequency-domain difference of the frequency-domain starting locations configured for the PSS and the corresponding SSS.

In an optional embodiment of the disclosure, after the time-frequency location of the master system information is determined, the master system information may be received or sent according to the time-frequency location of the master system information and a numerology set corresponding to the master system information.

The numerology set of the master system information may be the same as the numerology set for the PSS or different from the numerology set for the PSS.

In an alternative example, the numerology set of the master system information may be the same as the numerology set for the SSS or different from the numerology set for the SSS.

In an optional embodiment of the disclosure, the synchronization signal is configured to indicate at least one of the time-frequency location, modulation manner or corresponding numerology set of the master system information. Of course, the synchronization signal may also indicate other related information of the master system information. There are no limits made thereto in the embodiments of the disclosure.

In an optional embodiment of the disclosure, all or part of a sequence corresponding to the synchronization signal or a mask of the synchronization signal is configured to indicate at least one of the time-frequency location, modulation manner or corresponding numerology set of the master system information.

Figure 3:
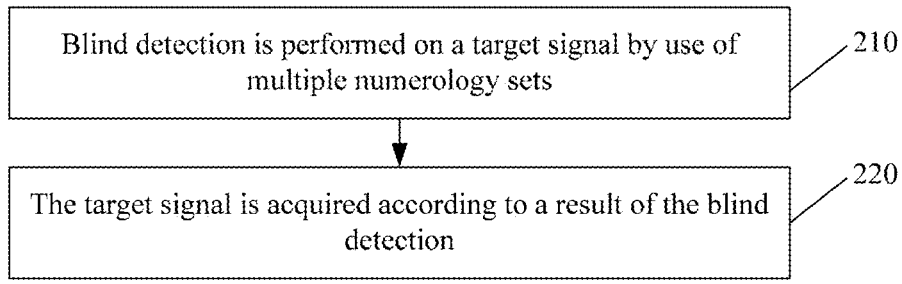
FIG. 3 is a schematic flowchart of an information transmission method according to an embodiment of the disclosure.

FIG. 3 is a schematic flowchart of an information transmission method 200 according to an embodiment of the disclosure. As illustrated in FIG. 2, the method 200 includes the following operations.

In 210, blind detection is performed on a target signal by use of multiple numerology sets.

In 220, the target signal is acquired according to a result of the blind detection.

Specifically, a sender may select a target numerology set from the multiple numerology sets for signal transmission. A receiver may perform blind detection on a synchronization signal by use of the multiple numerology sets and acquire the synchronization signal according to the result of the blind detection.

In an optional embodiment of the disclosure, the target signal is a synchronization signal and the synchronization signal includes a PSS and an SSS corresponding to the PSS.

In an optional embodiment of the disclosure, blind detection on the PSS is performed by use of a first subset of the multiple numerology sets. Blind detection on the SSS is performed by use of a second subset of the multiple numerology sets. The first subset and the second subset include at least one different numerology set.

In an optional embodiment of the disclosure, the first subset and the second subset include completely different numerology sets.

For example, in the embodiment of the disclosure, blind detection on the PSS is performed by using part of numerology sets (which may be called the first subset) in the multiple numerology sets. Blind detection on the SSS is performed by using the other part of numerology sets (which are called the second subset) in the multiple numerology sets.

In an optional embodiment, the first subset may be a subset of the second subset. That means, a selection range of the numerology set for sending the SSS is greater than or equal to a selection range of the numerology set for sending the PSS.

For example, in the embodiment of the disclosure, blind detection on the PSS is performed by use of part of the multiple numerology sets. Blind detection on the SSS is performed by use of the multiple numerology sets. A first numerology set and a second numerology set may be the same or different.

In an optional embodiment, blind detection may be performed on the SSS by use of the PSS, a relative location set of the PSS and the corresponding SSS and the second subset of the multiple numerology sets.

In an optional embodiment of the disclosure, during access of a terminal device, after a time-frequency location of the PSS is determined, blind detection may be performed at possible time-frequency locations of each SSS corresponding to the PSS according to a time-domain difference set and a frequency-domain difference set to acquire the SSS corresponding to the PSS.

Figure 4:
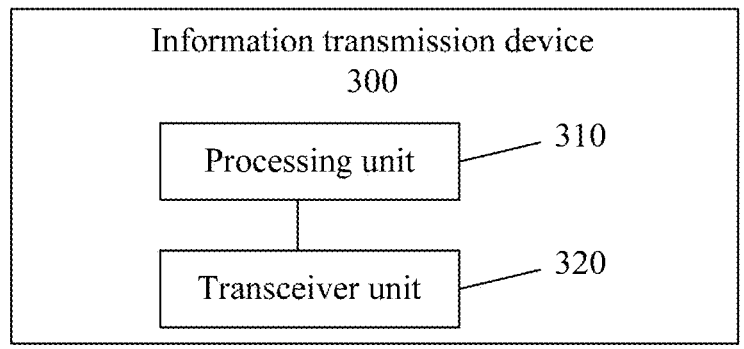
FIG. 4 is a schematic block diagram of an information transmission method according to an embodiment of the disclosure.

FIG. 4 is a schematic block diagram of an information transmission device 300 according to an embodiment of the disclosure. As illustrated in FIG. 4, the device 300 includes a processing unit 310 and a transceiver unit 320.

The processing unit 310 is configured to determine a target numerology set from multiple numerology sets.

The transceiver unit 320 is configured to receive or send a synchronization signal according to the target numerology set.

In an optional embodiment, the processing unit 310 may specifically be configured to determine the target numerology set from the multiple numerology sets according to at least one of the following information:

a carrier frequency for sending the synchronization signal;
a transmission environment of the synchronization signal;
coverage of a carrier, a cell or a transmission node for sending the synchronization signal;
transmit power for sending the synchronization signal; or
form, height, direction and a number of antenna array elements of a transmit antenna for sending the synchronization signal.

In an optional embodiment, the processing unit 310 may specifically be configured to determine a value of at least one numerology according to the information and determine the target numerology set according to the value of the at least one numerology.

In an optional embodiment, the synchronization signal includes a PSS and an SSS corresponding to the PSS.

In an optional embodiment, the target numerology set includes a first numerology set and a second numerology set. The first numerology set is different from the second numerology set.

The transceiver unit 320 may specifically be configured to: receive or send the PSS according to the first numerology set; and receive or send the SSS corresponding to the PSS according to the second numerology set.

In an optional embodiment, the target numerology set includes the first numerology set and the second numerology set.

The processing unit 310 may specifically be configured to select the first numerology set from a first subset of the multiple numerology sets, wherein the first subset includes at least one of the multiple numerology sets, and select the second numerology set from a second subset of the multiple numerology sets, wherein the second subset includes at least one of the multiple numerology sets. The first subset and the second subset include at least one different numerology set.

The transceiver unit 320 may specifically be configured to receive or send the PSS according to the first numerology set and receive or send the SSS according to the second numerology set.

In an optional embodiment, the transceiver unit 320 may further be configured to: receive or send master system information according to the first numerology set; or, receive or send the master system information according to the second numerology set; or, receive or send the master system information according to a third numerology set.

The third numerology set is different from the first numerology set and the second numerology set.

In an optional embodiment, a time-domain difference of time-domain starting locations of the PSS and the corresponding SSS belongs to a time-domain difference set and the time-domain difference set is a finite set; and/or, a difference of frequency-domain starting locations of the PSS and the corresponding SSS belongs to a frequency-domain difference set and the frequency-domain difference set is a finite set.

In an optional embodiment, at least one of the time-domain difference of the time-domain starting locations of the PSS and the corresponding SSS or the difference of the frequency-domain starting locations of the PSS and the corresponding SSS is not zero.

In an optional embodiment, a time-frequency location occupied by the PSS and a time-frequency location occupied by the corresponding SSS are not overlapped.

In an optional embodiment, the transceiver unit 320 may further be configured to receive or send the master system information.

In an optional embodiment, the transceiver unit 320 may specifically be configured to: receive or send the master system information according to a numerology set corresponding to the master system information. The numerology set corresponding to the master system information may be the same as or different from the target numerology set.

In an optional embodiment, the processing unit 310 may further be configured to determine a time-frequency location of the master system information according to a time-frequency location of the synchronization signal.

The transceiver unit 320 may further be configured to receive or send the master system information according to the time-frequency location of the master system information.

In an optional embodiment, the synchronization signal includes the PSS and the SSS corresponding to the PSS.

The processing unit 310 may specifically be configured to:
determine a time-domain starting location of the master system information according to at least one of a time-frequency starting location of the PSS, a time-domain starting location of the SSS or a time-domain difference of the time-domain starting locations of the PSS and the corresponding SSS; and
determine a frequency-domain starting location of the master system information according to at least one of a frequency-domain starting location of the PSS, a frequency-domain starting location of the SSS or a frequency-domain difference of the frequency-domain starting locations of the PSS and the corresponding SSS.

In an optional embodiment, the synchronization signal may be configured to indicate at least one of the time-frequency location, modulation manner or corresponding numerology set of the master system information.

In an optional embodiment, all or part of a sequence corresponding to the synchronization signal or a mask of the synchronization signal may be configured to indicate at least one of the time-frequency location, modulation manner or corresponding numerology set of the master system information.

In an optional embodiment, the numerology set includes at least one of the following parameters:

a subcarrier spacing, a subcarrier number at a specific bandwidth, a number of subcarriers in a PRB, a length of an OFDM symbol, a length of a CP of the OFDM symbol, a point number of Fourier transform or inverse Fourier transform for generating an OFDM signal, a number of OFDM symbols in a TTI or a number of TTIs in a specific length of time.

In an optional embodiment, the multiple numerology sets for determining the target numerology set exist in a time period from establishment to disabling of the carrier, cell or transmission node for sending the synchronization signal.

In an optional embodiment, the device 300 may be a terminal device or a network device.

It is to be understood that the device 300 illustrated in FIG. 4 may implement a corresponding flow of the method 100 and will not be elaborated herein for brief description.

Figure 5:
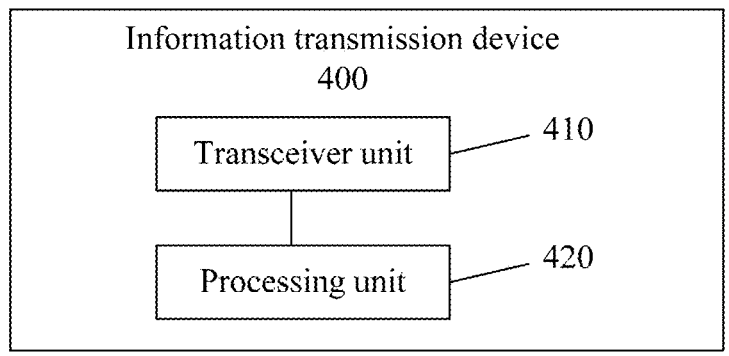
FIG. 5 is a schematic block diagram of an information transmission method according to an embodiment of the disclosure.

FIG. 5 is a schematic block diagram of a device 400 according to an embodiment of the disclosure. As illustrated in FIG. 5, the device 400 includes a transceiver unit 410 and a processing unit 420.

The transceiver unit 410 is configured to perform blind detection on a target signal by use of multiple numerology sets.

The processing unit 420 is configured to acquire the target signal according to a result of the blind detection.

In an optional embodiment, the target signal is a synchronization signal and the synchronization signal includes a PSS and an SSS corresponding to the PSS.

In an optional embodiment, the transceiver unit 410 may specifically be configured to perform blind detection on the PSS by use of a first subset of the multiple numerology sets and perform blind detection on the SSS by use of a second subset of the multiple numerology sets.

The first subset and the second subset include different numerology sets.

In an optional embodiment, the transceiver unit 410 may specifically be configured to: perform blind detection on the SSS by use of the PSS, a relative location set of the PSS and the corresponding SSS and the second subset of the multiple numerology sets. The first subset and the second subset include at least one different numerology set.

In an optional embodiment, the first subset may be a subset of the second subset.

In an optional embodiment, the numerology set includes at least one of the following parameters:

a subcarrier spacing, a subcarrier number at a specific bandwidth, a number of subcarriers in a PRB, a length of an OFDM symbol, a point number of Fourier transform or inverse Fourier transform for generating an OFDM signal, a number of OFDM symbols in a TTI, a number of TTIs in a specific length of time or a length of a signal prefix.

In an optional embodiment, the multiple numerology sets for performing blind detection on the target signal exist in a time period from establishment to disabling of a carrier, cell or transmission node for sending the target signal.

In an optional embodiment, the device 400 may be a terminal device or a network device.

It is to be understood that the device 400 illustrated in FIG. 5 may implement a corresponding flow of the method 200 and will not be elaborated herein for brief description.

Figure 6:
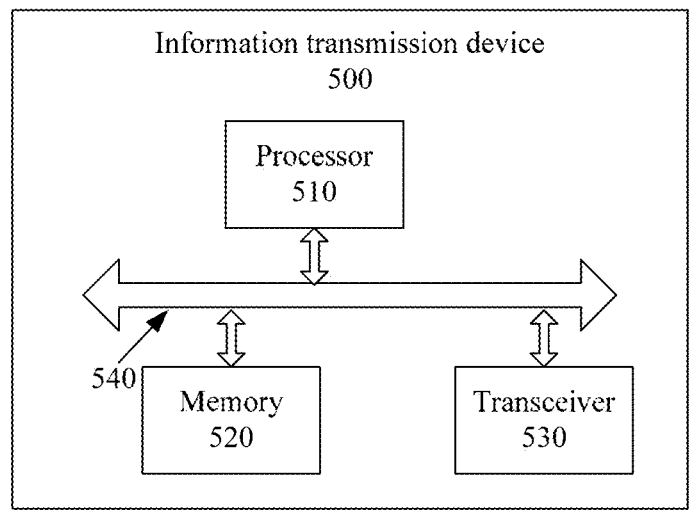
FIG. 6 is a schematic block diagram of an information transmission device according to an embodiment of the disclosure.

FIG. 6 is a schematic block diagram of a device 500 according to an embodiment of the disclosure. The device 500 includes a processor 510, a memory 520 and a transceiver 530. The memory 520 may be configured to store a program instruction. The processor 510 may call the program instruction stored in the memory 520. The transceiver 530 may be configured for external communication. In an optional embodiment, the device 500 further includes a bus system 540 for interconnecting the processor 510, the memory 520 and the transceiver 530.

Specifically, the processor 510 may be configured to call the instruction stored in the memory 520 to execute the following operations. A target numerology set is determined from multiple numerology sets.

A synchronization signal is received or sent through the transceiver 530 according to the target numerology set.

In an optional embodiment, the processor 510 may be configured to call the instruction stored in the memory 520 to execute the following operations: determining the target numerology set from the multiple numerology sets according to at least one of the following information:

a carrier frequency for sending the synchronization signal;

a transmission environment of the synchronization signal;

coverage of a carrier, cell or transmission node for sending the synchronization signal;

transmit power for sending the synchronization signal; or form, height, direction and a number of antenna array elements of a transmit antenna for sending the synchronization signal.

In an optional embodiment, the processor 510 may be configured to call the instruction stored in the memory 520 to execute the following operations. determining a value of at least one numerology is determined according to the information.

The target numerology set is determined according to the value of the at least one numerology.

In an optional embodiment, the synchronization signal includes a PSS and an SSS corresponding to the PSS.

In an optional embodiment, the target numerology set includes a first numerology set and a second numerology set, and the first numerology set is different from the second numerology set.

In an optional embodiment, the processor 510 may be configured to call the instruction stored in the memory 520 to execute the following operations. The PSS is received or sent according to the first numerology set; and The SSS corresponding to the PSS is received or sent according to the second numerology set.

In an optional embodiment, the target numerology set includes the first numerology set and the second numerology set. The processor 510 may be configured to call the instruction stored in the memory 520 to execute the following operations.

The first numerology set is selected from a first subset of the multiple numerology sets, and the first subset includes at least one of the multiple numerology sets, The second numerology set is selected from a second subset of the multiple numerology sets, the second subset includes at least one of the multiple t numerology sets and the first subset and the second subset include at least one different numerology set.

The PSS is received or sent through the transceiver 530 according to the first numerology set, The SSS is received or sent through the transceiver 530 according to the second numerology set.

In an optional embodiment, the processor 510 is configured to call the instruction stored in the memory 520 to execute one of the following operations. Master system information is received or sent through the transceiver 530 according to the first numerology set.

The master system information is received or sent through the transceiver 530 according to the second numerology set.

The master system information is received or sent through the transceiver 530 according to a third numerology set.

The third numerology set is different from the first numerology set and the second numerology set.

In an optional embodiment, a time-domain difference of time-domain starting locations of the PSS and the corresponding SSS belongs to a time-domain difference set and the time-domain difference set is a finite set; and/or, a difference of frequency-domain starting locations of the PSS and the corresponding SSS belongs to a frequency-domain difference set and the frequency-domain difference set is a finite set.

In an optional embodiment, at least one of the time-domain difference of the time-domain starting locations of the PSS and the corresponding SSS or the difference of the frequency-domain starting locations of the PSS and the corresponding SSS is not zero.

In an optional embodiment, a time-frequency location occupied by the PSS and a time-frequency location occupied by the corresponding SSS are not overlapped.

In an optional embodiment, the processor 510 may be configured to call the instruction stored in the memory 520 to execute the following operation: receiving or sending, through the transceiver 530, the master system information.

In an optional embodiment, the processor 510 may be configured to call the instruction stored in the memory 520 to execute the following operation: receiving or sending, through the transceiver 530, the master system information according to a numerology set corresponding to the master system information. The numerology set corresponding to the master system information may be the same as or different from the target numerology set.

In an optional embodiment, the processor 510 may be configured to call the instruction stored in the memory 520 to execute the following operations. A time-frequency location of the master system information is determined according to a time-frequency location of the synchronization signal.

The master system information is received or sent through the transceiver 530 according to the time-frequency location of the master system information.

In an optional embodiment, the synchronization signal includes the PSS and the SSS corresponding to the PSS.

The processor 510 may be configured to call the instruction stored in the memory 520 to execute the following operations.

A time-domain starting location of the master system information is determined according to at least one of a time-frequency starting location of the PSS, a time-domain starting location of the SSS or a time-domain difference of the time-domain starting locations of the PSS and the corresponding SSS.

A frequency-domain starting location of the master system information is determined according to at least one of a frequency-domain starting location of the PSS, a frequency-domain starting location of the SSS or a frequency-domain difference of the frequency-domain starting locations of the PSS and the corresponding SSS.

In an optional embodiment, the synchronization signal may be configured to indicate at least one of the time-frequency location, modulation manner or corresponding numerology set of the master system information.

In an optional embodiment, all or part of a sequence corresponding to the synchronization signal or a mask of the synchronization signal may be configured to indicate at least one of the time-frequency location, modulation manner or corresponding numerology set of the master system information.

In an optional embodiment, the numerology set includes at least one of the following parameters:

a subcarrier spacing, a subcarrier number at a specific bandwidth, a number of subcarriers in a PRB, a length of an OFDM symbol, a length of a CP of the OFDM symbol, a point number of Fourier transform or inverse Fourier transform for generating an OFDM signal, a number of OFDM symbols in a TTI or a number of TTIs in a specific length of time.

In an optional embodiment, the multiple numerology sets for determining the target numerology set may exist in a time period from establishment to disabling of the carrier, cell or transmission node for sending the synchronization signal.

In an optional embodiment, the device 300 may be a terminal device or a network device.

It is to be understood that the device 500 illustrated in FIG. 4 may implement a corresponding flow of the method 100 and will not be elaborated herein for brief description.

Figure 7:
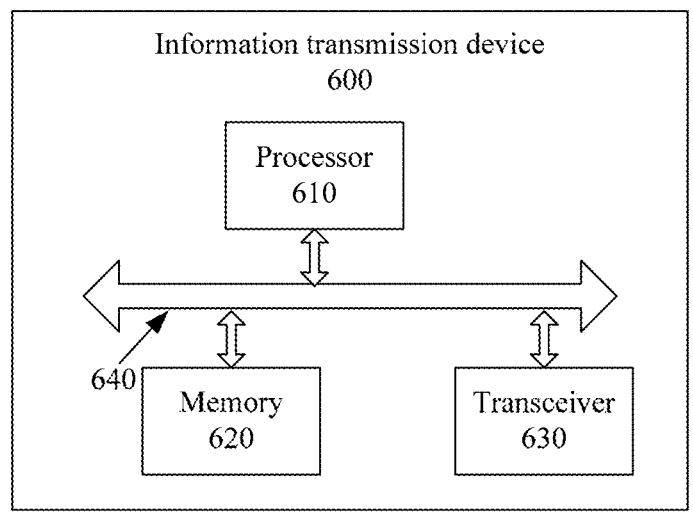
FIG. 7 is a schematic block diagram of an information transmission method according to an embodiment of the disclosure.

FIG. 7 is a schematic block diagram of a device 500 according to an embodiment of the disclosure. The device 500 includes a processor 610, a memory 620 and a transceiver 630. The memory 620 may be configured to store a program instruction. The processor 610 may call the program instruction stored in the memory 620. The transceiver 630 may be configured for external communication. In an optional embodiment, the device 600 further includes a bus system 640 for interconnecting the processor 610, the memory 620 and the transceiver 630.

Specifically, the processor 610 may be configured to call the instruction stored in the memory 620 to execute the following operations.

Blind detection is performed on a target signal through the transceiver 630 by use of multiple numerology sets.

The target signal is acquired according to a result of the blind detection.

In an optional embodiment, the target signal is a synchronization signal and the synchronization signal includes a PSS and an SSS corresponding to the PSS.

In an optional embodiment, the processor 610 may be configured to call the instruction stored in the memory 620 to execute the following operations.

Blind detection on the PSS is performed by use of a first subset of the multiple numerology sets.

Blind detection on the SSS is performed by use of a second subset of the multiple numerology sets.

The first subset and the second subset include different numerology sets.

In an optional embodiment, the processor 610 may be configured to call the instruction stored in the memory 620 to execute the following operation.

Blind detection on the SSS is performed by use of the PSS, a relative location set of the PSS and the corresponding SSS and the second subset of the multiple numerology sets. The first subset and the second subset include at least one different numerology set.

In an optional embodiment, the first subset is a subset of the second subset.

In an optional embodiment, the numerology set includes at least one of the following parameters:

a subcarrier spacing, a subcarrier number at a specific bandwidth, a number of subcarriers in a PRB, a length of an OFDM symbol, a point number of Fourier transform or inverse Fourier transform for generating an OFDM signal, a number of OFDM symbols in a TTI, a number of TTIs in a specific length of time or a length of a signal prefix.

In an optional embodiment, the multiple numerology sets for performing blind detection on the target signal may exist in a time period from establishment to disabling of a carrier, cell or transmission node for sending the target signal.

In an optional embodiment, the device 600 may be a terminal device or a network device.

It is to be understood that the device 600 illustrated in FIG. 7 may implement a corresponding flow of the method 200 and will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. An information transmission method, comprising:
   determining a target numerology set from multiple numerology sets; and
   sending a synchronization signal according to the target numerology set,
   wherein the synchronization signal comprises a Primary Synchronization Signal (PSS) and a Secondary Synchronization Signal (SSS) corresponding to the PSS,
   wherein a time-frequency location of master system information is determined according to a time-frequency location of the synchronization signal; and
   wherein the method further comprises:
   sending the master system information according to the time-frequency location of the master system information;
   wherein a time-domain starting location of the master system information is determined according to at least one of a time-frequency starting location of the PSS, a time-domain starting location of the SSS or a time-domain difference of time-domain starting locations of the PSS and the SSS corresponding to the PSS; and
   a frequency-domain starting location of the master system information is determined according to at least one of a frequency-domain starting location of the PSS, a frequency-domain starting location of the SSS or a frequency-domain difference of frequency-domain starting locations of the PSS and the SSS corresponding to the PSS.

2. The method of claim 1, wherein determining the target numerology set from the multiple numerology sets comprises:
   determining the target numerology set from the multiple numerology sets according to at least one of the following information:
   a carrier frequency for sending the synchronization signal;
   a transmission environment of the synchronization signal;
   coverage of a carrier, a cell or a transmission node for sending the synchronization signal;
   transmit power for sending the synchronization signal; or
   form, height, direction and a number of antenna array elements of a transmit antenna for sending the synchronization signal.

3. The method of claim 2, wherein determining the target numerology set from the multiple numerology sets comprises:
   determining a value of at least one numerology according to the information; and
   determining the target numerology set according to the value of the at least one numerology.

4. The method of claim 1, wherein the target numerology set comprises a first numerology set and a second numerology set;
  determining the target numerology set from the multiple numerology sets comprises: selecting the first numerology set from a first subset of the multiple numerology sets, wherein the first subset comprises at least one of the multiple numerology sets, and selecting the second numerology set from a second subset of the multiple numerology sets, wherein the second subset comprises at least one of the multiple numerology sets, the first subset and the second subset comprise at least one different numerology set; and
  sending the synchronization signal according to the target numerology set comprises: sending the PSS according to the first numerology set, and sending the SSS according to the second numerology set.

5. The method of claim 1, wherein sending the master system information comprises:
  sending the master system information according to a numerology set corresponding to the master system information, wherein the numerology set corresponding to the master system information is the same as or different from the target numerology set.

6. The method of claim 1, wherein the synchronization signal is configured to indicate at least one of a time-frequency location, a modulation manner or a corresponding numerology set of the master system information.

7. The method of claim 6, wherein all or part of a sequence corresponding to the synchronization signal or a mask of the synchronization signal is configured to indicate at least one of the time-frequency location, the modulation manner or the corresponding numerology set of the master system information.

8. The method of claim 1, wherein the numerology set comprises at least one of the following parameters:
  a subcarrier spacing, a subcarrier number at a specific bandwidth, a number of subcarriers in a Physical Resource Block (PRB), a length of an Orthogonal Frequency Division Multiplexing (OFDM) symbol, a length of a Cyclic Prefix (CP) of the OFDM symbol, a point number of Fourier transform or inverse Fourier transform for generating an OFDM signal, a number of OFDM symbols in a Transmission Time Interval (TTI) or a number of TTIs in a specific length of time.

9. The method of claim 1, wherein the multiple numerology sets for determining the target numerology set exist in a time period from establishment to disabling of a carrier, a cell or a transmission node for sending the synchronization signal.

10. An information transmission device, comprising:
  a processor, configured to determine a target numerology set from multiple numerology sets; and
  a transceiver, configured to receive or send a synchronization signal according to the target numerology set, wherein the synchronization signal comprises a Primary Synchronization Signal (PSS) and a Secondary Synchronization Signal (SSS) corresponding to the PSS,
  wherein a time-frequency location of master system information is determined according to a time-frequency location of the synchronization signal, a time-domain starting location of the master system information is determined according to at least one of a time-frequency starting location of the PSS, a time-domain starting location of the SSS or a time-domain difference of time-domain starting locations of the PSS and the SSS corresponding to the PSS; and a frequency-domain starting location of the master system information is determined according to at least one of a frequency-domain starting location of the PSS, a frequency-domain starting location of the SSS or a frequency-domain difference of frequency-domain starting locations of the PSS and the SSS corresponding to the PSS; and
  wherein the transceiver is further configured to send the master system information according to the time-frequency location of the master system information.

11. The device according to claim 10, wherein the processor is configured to:
  determine the target numerology set from the multiple numerology sets according to at least one of the following information:
  a carrier frequency for sending the synchronization signal;
  a transmission environment of the synchronization signal;
  coverage of a carrier, a cell or a transmission node for sending the synchronization signal;
  transmit power for sending the synchronization signal; and
  form, height, direction and a number of antenna array elements of a transmit antenna for sending the synchronization signal.

12. The device according to claim 11, wherein the processor is configured to:
  determine a value of at least one numerology according to the information; and
  determine the target numerology set according to the value of the at least one numerology.

13. The device of claim 10, wherein the target numerology set comprises a first numerology set and a second numerology set;
  the processor configured to select the first numerology set from a first subset of the multiple numerology sets, the first subset comprising at least one of the multiple numerology sets, and select the second numerology set from a second subset of the multiple numerology sets, the second subset comprising at least one of the multiple numerology sets and the first subset and the second subset comprising at least one different numerology set; and
  the transceiver is configured to send the PSS according to the first numerology set and send the SSS according to the second numerology set.

14. The device of claim 10, wherein the transceiver is configured to:
  send the master system information according to a numerology set corresponding to the master system information, wherein the numerology set corresponding to the master system information is the same as or different from the target numerology set.

15. The device of claim 10, wherein the synchronization signal is configured to indicate at least one of a time-frequency location, a modulation manner or a corresponding numerology set of the master system information.

16. The device of claim 15, wherein all or part of a sequence corresponding to the synchronization signal or a mask of the synchronization signal is configured to indicate at least one of the time-frequency location, the modulation manner or the corresponding numerology set of the master system information.

17. The device of claim 10, wherein the numerology set comprises at least one of the following parameters:
  a subcarrier spacing, a subcarrier number at a specific bandwidth, a number of subcarriers in a Physical Resource Block (PRB), a length of an Orthogonal Frequency Division Multiplexing (OFDM) symbol, a length of a Cyclic Prefix (CP) of the OFDM symbol, a point number of Fourier transform or inverse Fourier transform for generating an OFDM signal, a number of OFDM symbols in a Transmission Time Interval (TTI) or a number of TTIs in a specific length of time.

18. The device of claim 10, wherein the multiple numerology sets for determining the target numerology set exist in a time period from establishment to disabling of a carrier, a cell or a transmission node for sending the synchronization signal.

* * * * *